US008364078B2

(12) United States Patent
Rhodes et al.

(10) Patent No.: US 8,364,078 B2
(45) Date of Patent: *Jan. 29, 2013

(54) COMMUNICATIONS SYSTEM

(75) Inventors: Mark Rhodes, Edinburgh (GB); Derek Wolfe, West Lothian (GB); Brendan Hyland, Edinburgh (GB)

(73) Assignee: WFS Technologies Ltd., Edinburgh (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/210,996

(22) Filed: Aug. 16, 2011

(65) Prior Publication Data

US 2011/0300795 A1   Dec. 8, 2011

Related U.S. Application Data

(63) Continuation of application No. 12/699,107, filed on Feb. 3, 2010, now Pat. No. 8,045,919, which is a continuation of application No. 11/454,630, filed on Jun. 15, 2006, now Pat. No. 7,711,322.

(60) Provisional application No. 60/690,964, filed on Jun. 15, 2005, provisional application No. 60/690,966, filed on Jun. 15, 2005, provisional application No. 60/690,959, filed on Jun. 15, 2005.

(30) Foreign Application Priority Data

Feb. 7, 2006  (GB) .................................. 0602398.0

(51) Int. Cl.
*H04B 13/02* (2006.01)

(52) U.S. Cl. ............... 455/40; 455/72; 455/96; 455/98; 455/502; 367/131; 367/142; 367/141; 367/901; 367/904; 340/850; 343/719; 114/238; 114/321

(58) Field of Classification Search .................. 455/40, 455/72, 502, 96, 98; 367/131, 142, 901, 367/904, 141, 134; 343/719; 340/850; 114/321, 114/238
See application file for complete search history.

(56) References Cited

U.S. PATENT DOCUMENTS

| | | | | | |
|---|---|---|---|---|---|
| 5,579,285 | A | * | 11/1996 | Hubert | 367/133 |
| 5,598,152 | A | * | 1/1997 | Scarzello et al. | 340/850 |
| 5,729,134 | A | * | 3/1998 | Lavan et al. | 324/239 |
| 5,894,450 | A | * | 4/1999 | Schmidt et al. | 367/134 |
| 6,058,071 | A | * | 5/2000 | Woodall et al. | 367/3 |
| 6,125,080 | A | * | 9/2000 | Sonnenschein et al. | 367/134 |
| 6,130,859 | A | * | 10/2000 | Sonnenschein et al. | 367/134 |
| 6,154,179 | A | | 11/2000 | Kohno | 343/719 |
| 6,483,865 | B1 | * | 11/2002 | Beierle | 375/130 |
| 6,677,757 | B2 | * | 1/2004 | Fine et al. | 324/360 |

(Continued)

FOREIGN PATENT DOCUMENTS

| | | |
|---|---|---|
| GB | 2163029 A | 2/1986 |
| WO | WO 8704028 | 7/1987 |

*Primary Examiner* — Marceau Milord
(74) *Attorney, Agent, or Firm* — Paul Davis; Goodwin Procter LLP

(57) ABSTRACT

An underwater communications system is provided that transmits electromagnetic and/or magnetic signals to a remote receiver. The transmitter includes a data input. A digital data compressor compresses data to be transmitted. A modulator modulates compressed data onto a carrier signal. An electrically insulated, magnetic coupled antenna transmits the compressed, modulated signals. The receiver that has an electrically insulated, magnetic coupled antenna for receiving a compressed, modulated signal. A demodulator is provided for demodulating the signal to reveal compressed data. A de-compressor de-compresses the data. An appropriate human interface is provided to present transmitted data into text/audio/visible form. Similarly, the transmit system comprises appropriate audio/visual/text entry mechanisms.

18 Claims, 15 Drawing Sheets

U.S. PATENT DOCUMENTS

| | | | |
|---|---|---|---|
| 6,967,574 B1 * | 11/2005 | Nelson | 340/551 |
| 7,148,691 B2 * | 12/2006 | Nelson et al. | 324/326 |
| 7,496,002 B2 * | 2/2009 | Vosburgh | 367/188 |
| 7,711,322 B2 * | 5/2010 | Rhodes et al. | 455/40 |
| 7,853,206 B2 * | 12/2010 | Rhodes et al. | 455/40 |
| 8,045,919 B2 * | 10/2011 | Rhodes et al. | 455/40 |
| 2004/0266497 A1 | 12/2004 | Reagor et al. | 455/575.1 |

* cited by examiner

COMMUNICATIONS SYSTEM

CROSS-REFERENCE TO RELATED APPLICATION

This application is a continuation of U.S. Ser. No. 12/699,107, filed Feb. 3, 2010, now U.S. Pat. No. 8,045,919 which is a continuation of U.S. Ser. No. 11/454,630, filed Jun. 15, 2006, now U.S. Pat. No. 7,711,322 which claims the benefit of U.S. Ser. Nos. 60/690,964, 60/690,966 and 60/690,959 all filed Jun. 15, 2005. Said U.S. Ser. No. 11/454,630 also claims priority from GB0602398.0, filed Feb. 7, 2006. All of the above applications are fully incorporated herein by reference.

FIELD OF USE

The present invention relates generally to an underwater communications system, and its methods of use, and more particularly to an underwater communications system that uses electromagnetic propagation and magnetic induction transmission, and optimizes the distance which can be achieved by digital transmission of information.

DESCRIPTION OF THE RELATED ART

Various underwater communication systems are known. One of the most common is based on acoustic techniques. A problem with such systems is that they are degraded by noise and interference from a number of sources. They are also subject to multi-path effects and in some environments are virtually unusable. Other underwater communication systems use radio links, e.g. extreme low frequency electromagnetic signals, usually for long-range communications between a surface station and a submerged vessel. These systems typically operate in the far field using physically large electric field coupled antennas and support data rates up to a few bits per second.

WO01/95529 describes an underwater communications system that uses electromagnetic signal transmission. This system has a transmitter and a receiver, each having a metallic, magnetic coupled aerial surrounded by a waterproof electrically insulating material. Use of electrically insulated magnetic coupled antennas in the system of WO01/95529 provides various advantages. This is because magnetically coupled antennas launch a predominantly magnetic field. A similar arrangement is described in GB2163029. Whilst the communications systems of WO01/95529 and GB2163029 have some technical advantages over more conventional acoustic or radio link systems, the functionality described is limited, and for many practical applications the available bandwidth is highly restrictive, as is distance over which data can be transmitted.

Magnetic antennas formed by a wire loop, coil or similar arrangements create both magnetic and electromagnetic fields. The magnetic or magneto-inductive field is generally considered to comprise two components of different magnitude that, along with other factors, attenuate with distance (r), at rates proportional to $1/r^2$ and $1/r^3$ respectively. Together they are often termed the near field components. The electromagnetic field has a still different magnitude and, along with other factors, attenuates with distance at a rate proportional to $1/r$. It is often termed the far field or propagating component.

Signals based on electrical and magnetic fields are rapidly attenuated in water due to its partially electrically conductive nature. Seawater is more conductive than fresh water and produces higher attenuation. Propagating radio or electromagnetic waves are a result of an interaction between the electric and magnetic fields. The high conductivity of seawater attenuates the electric field. Water has a magnetic permeability close to that of free space so that a purely magnetic field is relatively unaffected by this medium. However, for propagating electromagnetic waves the energy is continually cycling between magnetic and electric field and this results in attenuation of propagating waves due to conduction losses.

The attenuation losses, the bandwidth restrictions and the limited distances over which data can be transmitted all pose significant practical problems for underwater communications.

Existing methods of acoustic communication are inherently restricted in the distance they can achieve at effective data rates. This is particularly true where the signal reaches a receiver by multiple paths (reflections occurring from an irregular sea floor, the sea surface, the coastline, nearby objects and the like, we well as when the sound wave path exhibits discontinuities in its properties (wave wash, bubbles in the water, changes in water density due to salinity variations). Little is known which can lessen these difficulties. The existing art of electromagnetic communication under water fails to recognize measures that can be taken to maximize the distance and/or useful information rate which can be achieved by adapting the devices sourcing and using the information so that more effective signal frequencies can be adopted.

SUMMARY OF THE INVENTION

Accordingly, an object of the present invention is to provide an improved underwater communication systems, and its methods of use, that uses electromagnetic waves for communication and propagation.

Another object of the present invention an underwater communication system, and its methods of use, for communication and propagation that increases the distance over which information can be transmitted.

Another object of the present invention an underwater communication systems, and its methods of use, for communication and propagation that increases the useful information rate.

Another object of the present invention an underwater communication systems, and its methods of use, for communication and propagation with improved data compression by reducing the transmitted bit rate.

Another object of the present invention an underwater communication systems, and its methods of use, for communication and propagation where the transmitted bit rate is reduced when there are a number of types of information sources.

Another object of the present invention an underwater communication systems, and its methods of use, for communication and propagation that has a resultant reduced bit rate that allows lower transmitted signal frequencies to be adopted.

Another object of the present invention an underwater communication system, and its methods of use, for communication and propagation that has lower transmitted signal frequencies to achieve greater distance and/or allow greater rates at a particular distance.

These and other objects of the present invention are achieved in, an underwater communications system for transmitting electromagnetic and/or magnetic signals to a remote receiver that includes a data input. A digital data compressor compresses data to be transmitted. A modulator modulates compressed data onto a carrier signal. An electrically insulated, magnetic coupled antenna transmits the compressed, modulated signals.

In another embodiment of the present invention, an underwater communications system includes a receiver that has an electrically insulated, magnetic coupled antenna for receiving a compressed, modulated signal. A demodulator is provided for demodulating the signal to reveal compressed data. A de-compressor de-compresses the data.

In another embodiment of the present invention, an underwater communications system includes a transmitter for transmitting electromagnetic and/or magnetic signals. A receiver receives signals from the transmitter. At least one intermediate transceiver receives electromagnetic and/or magnetic signals from the transmitter and passes them to the receiver. At least one of the transmitter and receiver is underwater and includes an electrically insulated, magnetic coupled antenna.

DETAILED DESCRIPTION

Figure 1:
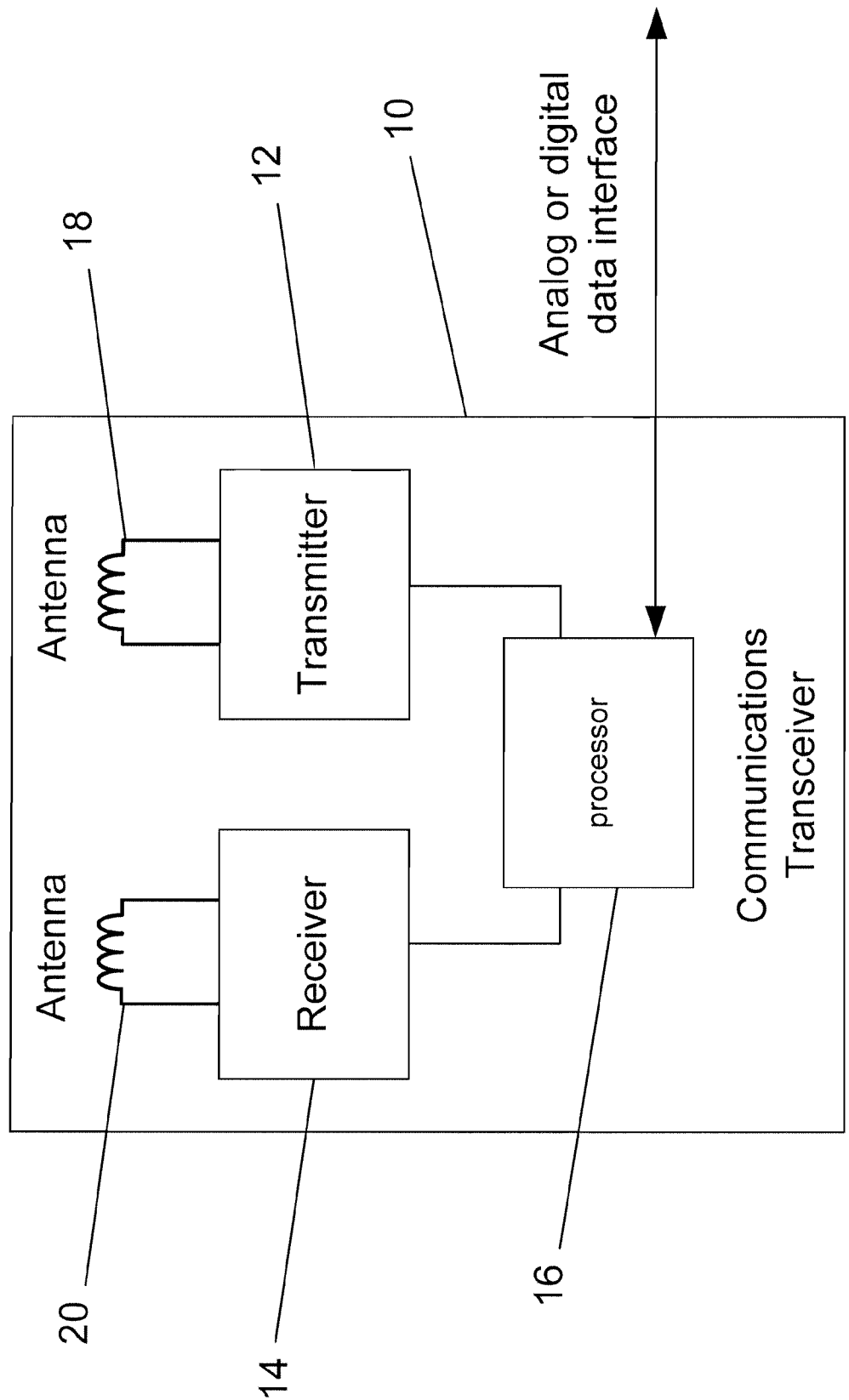
FIG. 1 is a block diagram of one embodiment of an underwater transceiver of the present invention.

In various embodiments, the present invention relates to underwater communication systems, and their methods of use, that use electromagnetic signals as the communicating means. Each of these uses a communications transceiver 10 that has a transmitter 12, a receiver 14 and a processor 16 which can be connected to an analogue or digital data interface (not shown), as illustrated in FIG. 1. Both the transmitter and receiver 12 and 14 respectively have a waterproof, electrically insulated magnetic coupled antenna 18 and 20. Alternatively a single antenna can be shared between transmitter and receiver. A magnetic coupled antenna is used because water is an electrically conducting medium, and so has a significant impact on the propagation of electromagnetic signals. Ideally, each insulated antenna assembly is surrounded by a low conductivity medium that is impedance matched to the propagation medium, for example distilled water.

Figure 2:
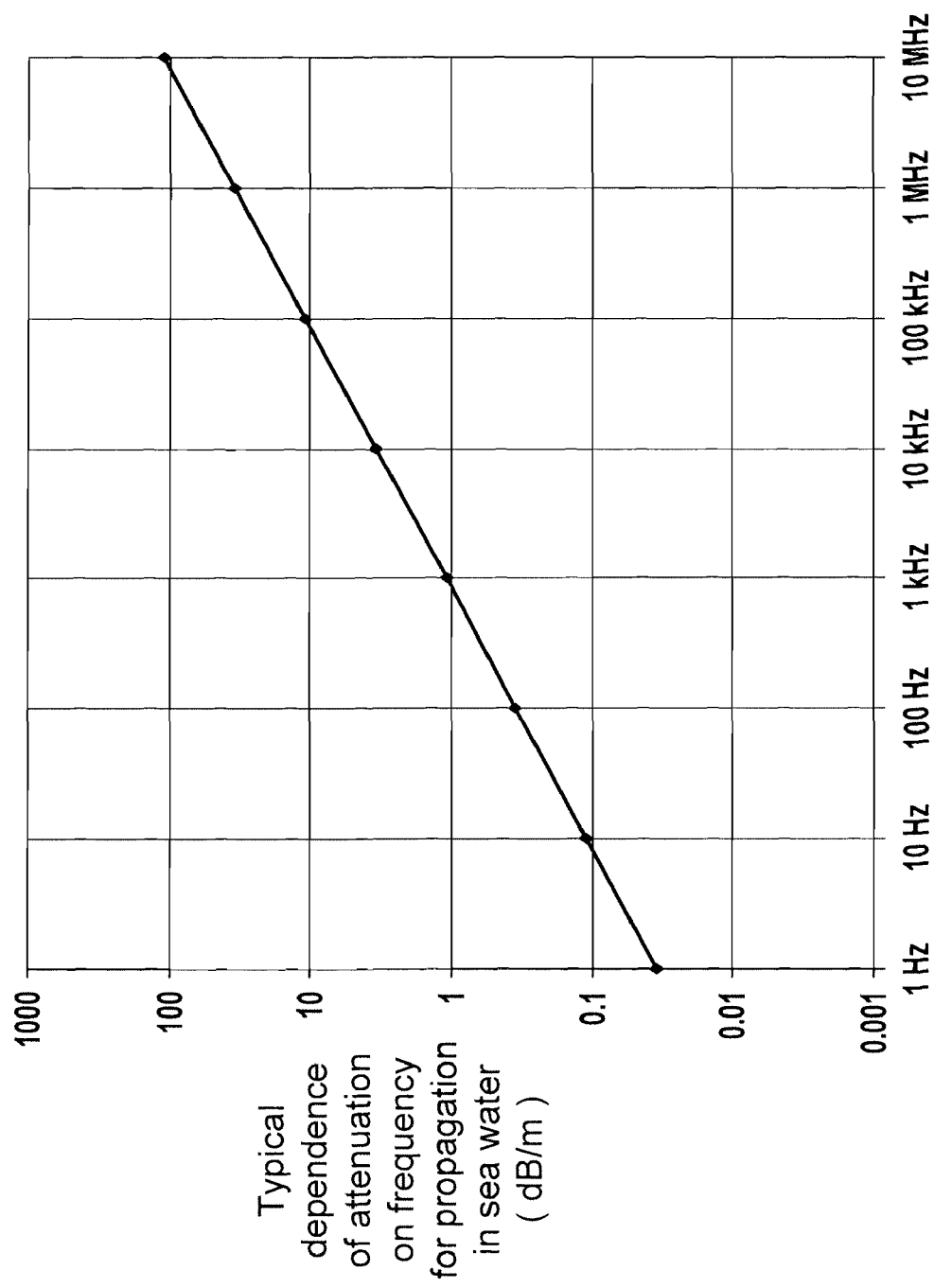
FIG. 2 shows the attenuation typically experienced by a signal propagating in seawater, and how its attenuation expressed in decibels increases approximately in proportion to the square root of frequency.

Electrically insulated magnetic coupled antennas are used in the communication systems in which various embodiments of the present invention are embodied because in an underwater environment they are more efficient than electrically coupled antennas. Underwater attenuation is largely due to the effect of conduction on the electric field. Since electrically coupled antennas produce a higher electric field component, in water in the near field, the radiated signal experiences higher attenuation. In comparison a magnetic loop antenna produces strong magneto-inductive field terms in addition to the electromagnetic propagating field. The magneto-inductive terms are greater than the propagating field close to the transmitting antenna and provide an additional means for coupling a signal between two antennas. For both shorter and greater distances, magnetic coupled antennas are more efficient under water than electrically coupled. In applications where long distance transmission is required, the magnetic antenna should preferably be used at lowest achievable signal frequency. This is because signal attenuation in water increases as a function of increasing frequency, as shown in FIG. 2. Hence, minimizing the carrier frequency where possible allows the transmission distance to be maximized. In practice, the lowest achievable signal frequency will be a function of the desired bit rate and the required distance of transmission.

Figure 3:
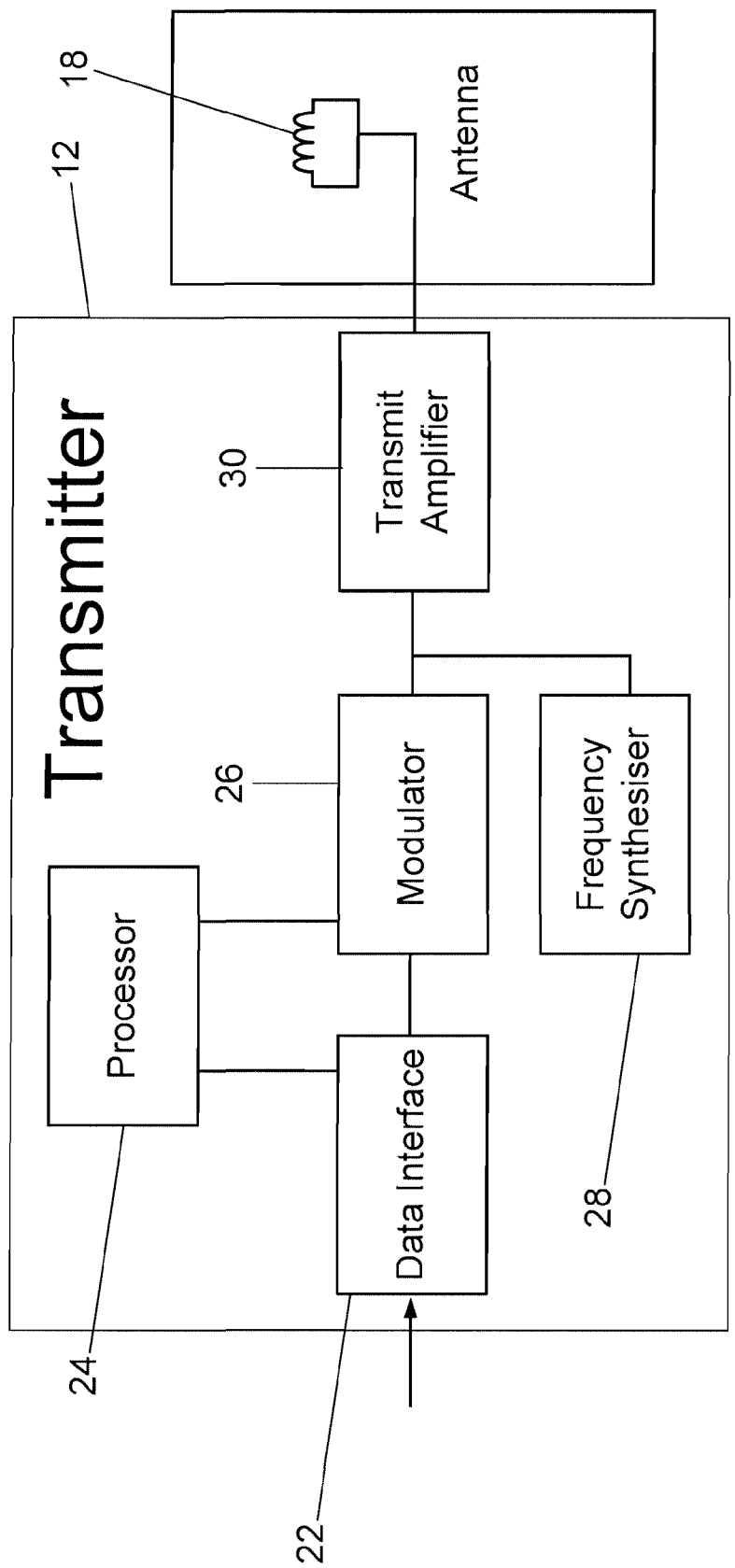
FIG. 3 is a block diagram of an underwater transmitter that can be used in the transceiver of FIG. 1.

FIG. 3 illustrates an example of a transmitter 12 for use in the transceiver 10 of FIG. 1. This has a data interface 22 that is connected to each of a processor 24 and a modulator 26. The modulator 26 is provided to encode data onto a carrier wave. At an output of the modulator 26 are a frequency synthesizer 28 that provides a local oscillator signal for up-conversion of the modulated carrier and a transmit amplifier 30, which is connected to the underwater, electrically insulated magnetic coupled antenna 18. In use, the transmitter processor 24 is operable to cause electromagnetic communication signals to be transmitted via the antenna at a selected carrier frequency.

Figure 4:
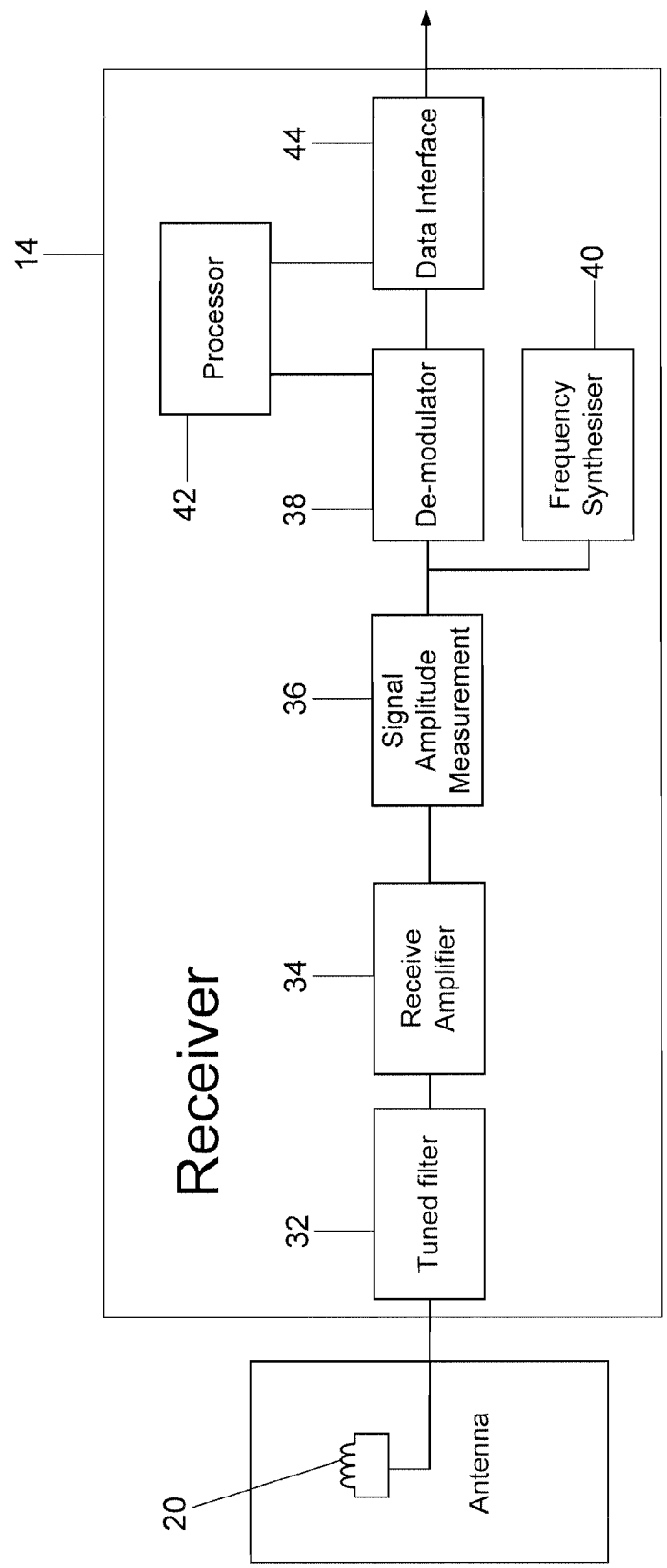
FIG. 4 is a block diagram of an underwater receiver for use in the transceiver of FIG. 1.

FIG. 4 illustrates an example of a receiver 14 for use with the transceiver of FIG. 1. As with the transmitter, this has an electrically insulated magnetic antenna 20 adapted for underwater usage. This antenna is operable to receive magnetic field signals from the transmitter. Connected to the antenna 20 is a tuned filter 32 that is in turn connected to a receive amplifier 34. At the output of the amplifier 34 is a signal amplitude measurement module 36 that is coupled to a de-modulator 38 and a frequency synthesizer 40, which provides a local oscillator signal for down conversion of the modulated carrier. Connected to the de-modulator 38 are a processor 42 and a data interface 44, which is also connected to the processor 42. The data interface 44 is provided for transferring data from the receiver 14 to a control or monitoring means, such as another on-board processor, which may be located in the mobile device 10 or at another remote location.

As an alternative, or additional, type of receiver to that of the heterodyne method described, communications practitioners will appreciate that a receiver of the homodyne principle may be employed.

In one embodiment of the present invention, an underwater communications system is provided for transmitting data to a remote receiver. In this embodiment, the system can have a data input; a data compressor for compressing data that is to be transmitted; a modulator for modulating the compressed data onto a carrier signal and an electrically insulated, magnetic coupled antenna for transmitting the compressed, modulated signals. It will be appreciated that the words remote and local used herein are relative terms used merely to differentiate device sites for the purpose of description, and do not necessarily imply any particular distances.

By compressing the data prior to transmission, the occupied transmission bandwidth can be reduced. This allows use of a lower carrier frequency, which leads to lower attenuation. This in turn allows communication over greater transmission distances, thereby significantly alleviating the difficulty of communication through water. Digital representation of audio and or video, data compression and transmission at the lowest practicable frequency are therefore particularly advantageous in the subsea environment and represents a key innovation. While data compression is usually highly desirable, it will be appreciated that it is not essential to the operation of different embodiments of the present invention.

Whether or not compressed, data in some applications of the present invention can be encrypted before transmission and decrypted after receiving, when desired for reasons of security. Although a low carrier frequency is usually optimal to maximize distance, there may be occasions when a higher frequency is satisfactory but more desirable in order to reduce the distance over which an unwanted receiving party can detect the signal, as in deliberately covert operation of a communication system.

In one embodiment of the present invention, error correction techniques are applied to the information transferred. Error correction techniques slightly increase the amount of data which must pass over the communication links themselves, but can be advantageous in allowing operation at greater distances which otherwise would have resulted in unreliable transfer of information. Error correction can be of the types commonly and generically known as forward error correction (FEC) and automatic repeat request (ARQ). For somewhat random errors which are well spaced and do not occur in long runs, FEC is preferable; and beneficially the effectiveness of FEC may be increased by first applying an interleaving process, as known in the art.

In various embodiments, the system of the present invention can include data/text entry means, such as a keypad, and/or audio means for capturing audio signals and/or video means, such as a camera, for capturing an image. Having inputs, such as a text entry pad and a camera, provides an extended functionality device, and extends the range of device applications. Alternative approaches such as employing speech to text conversion and text to speech offer additional bandwidth reduction and therefore range benefits.

In one embodiment, a display may be provided so that text/data entered and/or video/images can be viewed prior to transmission.

In one embodiment, the communications module of the present invention includes a receiver that has an electrically insulated, magnetic coupled antenna for receiving electromagnetic signals. In this embodiment, the module is preferably operable to present received text/data and/or video/images on the module display. The transmitter and the receiver may share a single electrically insulated, magnetic coupled antenna.

In one embodiment, the system of the present invention can be configured to change the carrier frequency to optimise the information communication rate for the transmission range and conditions encountered. In another embodiment, the system of the present invention can be configured to establish a connection; commence transmission at a first frequency; once communication is established, vary the frequency and select the frequency based on the received signal strength.

In one embodiment of the present invention, the magnetic coupled antenna used with certain embodiments of the present invention can be based on loops or solenoids. The solenoid may be formed around a high magnetic permeability material. The insulated antenna may be surrounded with a low conductivity material with permittivity matched to that of the propagation medium e.g. distilled water.

To further improve communications, the transmission distance has to be taken into account. By way of illustration, for short distance transmission, the magnetic components provide the greater signal, whereas longer distances are best served by the electromagnetic component. Hence for short distance communications, near field transmission is preferred, whereas for longer distance communications, far field transmission is preferred. Whether the magnetic components or the electromagnetic component dominate is a matter dependent on the application of the invention and the distance over which it is deployed.

In another embodiment of the present invention, an underwater communications system is provided that includes, an underwater transmitter having an electrically insulated, magnetic coupled antenna for transmitting electromagnetic signals to a receiver, and an underwater receiver having an electrically insulated, magnetic coupled antenna for receiving signals from the underwater transmitter, wherein the transmitter and receiver are adapted to communicate when the near fields of the transmitting antenna and receiving antenna overlap. The near field may be defined approximately as the region where the $1/r^2$ and $1/r^3$ varying terms are greater than the propagating $1/r$ term (where r=radial distance).

Near field subsea magneto-inductive communications links can support much higher carrier frequencies than possible in the far field. In turn, communication in the near field allows a significantly higher signal bandwidth than is available for far field transmissions. While the near field components are relatively greatest close to an antenna, their rate of decline with distance is faster than that of the far field component. When the antenna is magnetic, the important advantage of lower loss is gained over conventional electromagnetic antennas of the types commonly used in free space. In addition the relative initial strength of the magnetic field in comparison with the electromagnetic field is considerably greater still.

In another embodiment of the present invention, an underwater communications system includes a transmitter for transmitting electromagnetic signals to a remote receiver, and a receiver for receiving signals from the transmitter, wherein at least one of the transmitter and receiver is underwater and has an electrically insulated, magnetic coupled antenna. One of the transmitter and receiver may be above water and may have an electrically coupled antenna.

In another embodiment of the present invention, an underwater communications system includes, a transmitter for transmitting electromagnetic signals to a remote receiver, and a receiver for receiving signals from the transmitter, wherein at least one of the transmitter and receiver includes means for varying the signal gain. This is advantageous for systems in which one or both antennas may be subjected to wave wash, where the antenna is periodically partially or wholly immersed in water. By providing means for varying the gain, performance can be maintained even when one or more of the antennas is subject to wave wash.

In another embodiment of the present invention, an underwater communications system includes a device for transmitting electromagnetic signals and means for transmitting acoustic signals and/or optical signals. In use, the system of this embodiment can be \ controlled such that the optimal route for communication is utilized be it electromagnetic, acoustic or optical. Under different or changing conditions, one or more of these methods may provide superior performance at different times.

For reception of weak signals, such as at greater distances, the reduction of received interfering noise will be important. This may be accomplished by filtering the received signal to the minimum bandwidth possible, consistent with the bandwidth of the wanted signal, before making decisions on the received digital signal states. Alternatively, or in addition, digital bit states may be represented in transmission by known and readily distinguishable sequences of sub-bits transmitted at a higher rate, and correlation techniques adopted to determine the likely presence of each sequence and hence the value of each received bit. Such techniques will be familiar to those skilled in the techniques of communication in other fields.

A further technique, often advantageous where effects such as multi-path propagation, fading and dispersion exist between transmitter and receiver, is that of spread spectrum, in which transmission power is deliberately distributed over a wide bandwidth and correlation methods are used in receivers. As will be known to communication practitioners, the spread spectrum technique is enhanced if the known RAKE method is also adopted in receivers.

Furthermore, while carrier-based techniques with impressed modulation have been described, un-modulated methods without a carrier also may be adopted, wherein a representation of the baseband data is used directly to energize the antenna.

Figure 5:
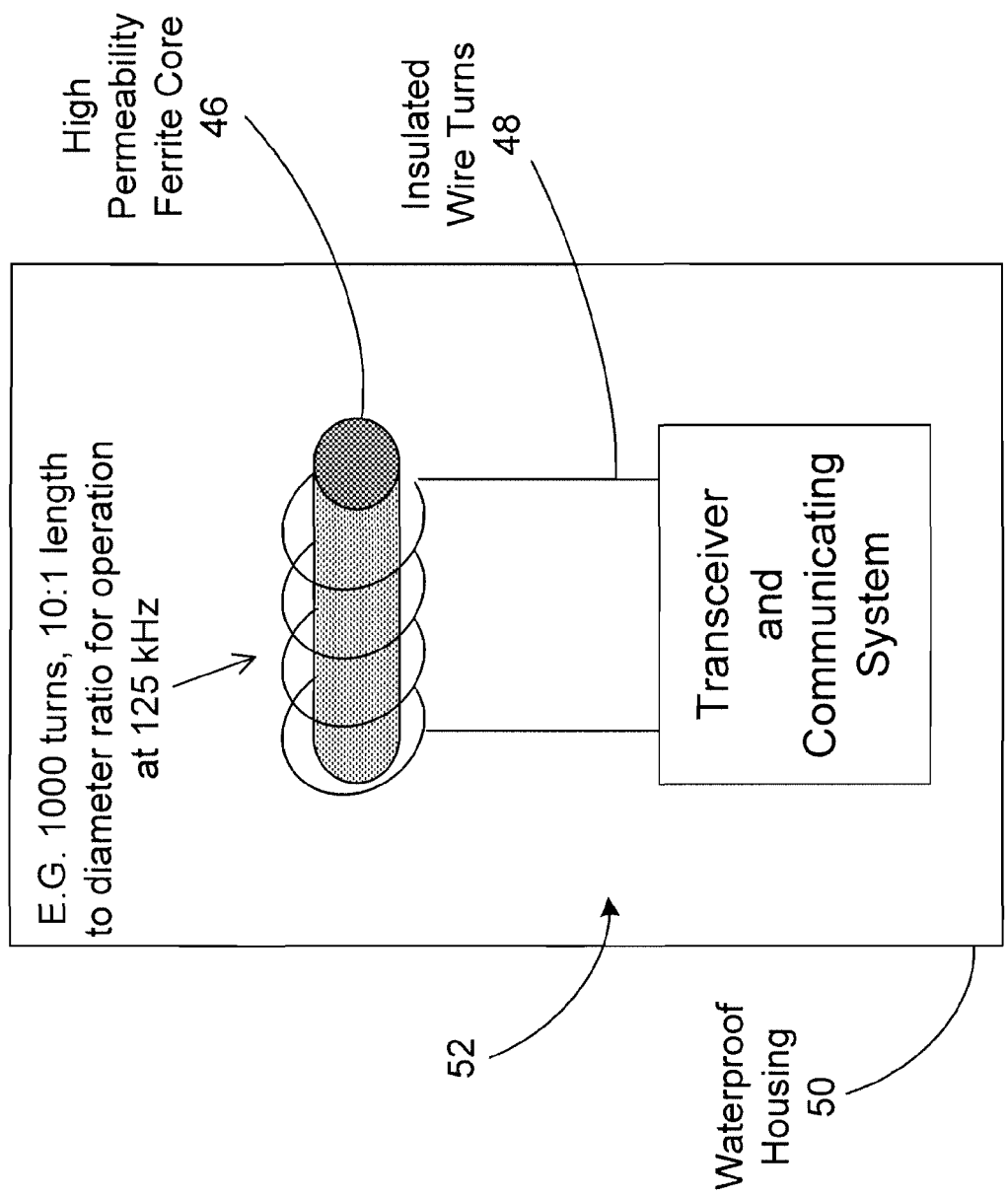
FIG. 5 is a block diagram of an underwater antenna for use in the transmitter of FIG. 3 and receiver of FIG. 4.

FIG. 5 illustrates an example of an antenna that can be used in the transmitter and receiver of FIGS. 3 and 4. This has a high permeability ferrite core 46. Wound round the core are multiple loops 48 of an insulated wire. The number of turns of the wire and length to diameter ratio of the core 46 can be selected depending on the application. However, for operation at 125 kHz, one thousand turns and a 10:1 length to diameter ratio is suitable. The antenna is connected to the relevant transmitter/receiver assembly and is included in a waterproof housing 50. Within the housing the antenna may be surrounded by air or some other suitable insulator 52, for example, low conductivity medium such as distilled water that is impedance matched to the propagating medium.

Figure 6:
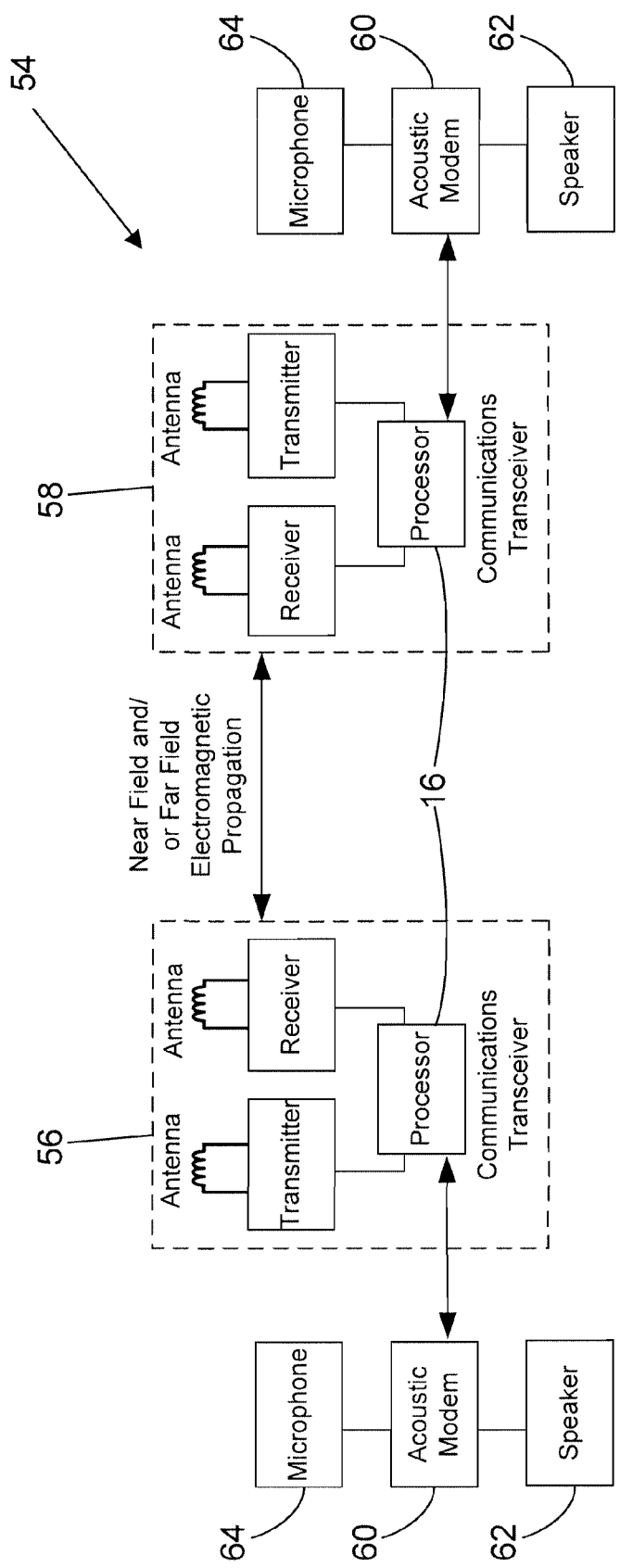
FIG. 6 is a block diagram of one embodiment of a system of the present invention for allowing underwater diver-to-diver voice communications.

FIG. 6 illustrates a telecommunications system 54 for underwater diver-to-diver or similar communications. This includes two telecommunications units 56 and 58, each of which includes the transceiver of FIG. 1. In this case, connected to the processor 16 of the transceiver is an acoustic interface 60, which is connected between a speaker 62 and a microphone 64. The processor 16 is operable to allow voice-to-voice communication between divers using electromagnetic propagation as the communication channel. One function of the processor 16 is to convert the digital representation of analogue signals from the acoustic interface 60 to and from a highly compressed form of encoding, using known vocoder or similar techniques which greatly reduce the required bit-rate for intelligible conversation. The transmission protocol used could be point-to-point or broadcast, depending on the application. In practice, the speech compression algorithms used to reduce bandwidth and carrier frequency significantly increases the range of reception for underwater communications. In this case the carrier frequency could typically be in the range 1-100 kHz, for example 30 kHz. Techniques for allowing wireless voice-to-voice communications are known in the art and so will not be described in detail, save to say that modern vocoder techniques can achieve very low bit-rates while still ensuring good intelligibility between persons. By using such a vocoder, the low bit rates can enable greater distance to be achieved under water. In practice, the units would be included in a full-face mask, as commonly used by commercial divers, to facilitate voice communications. The speaker would form a waterproof earpiece.

Figure 7:
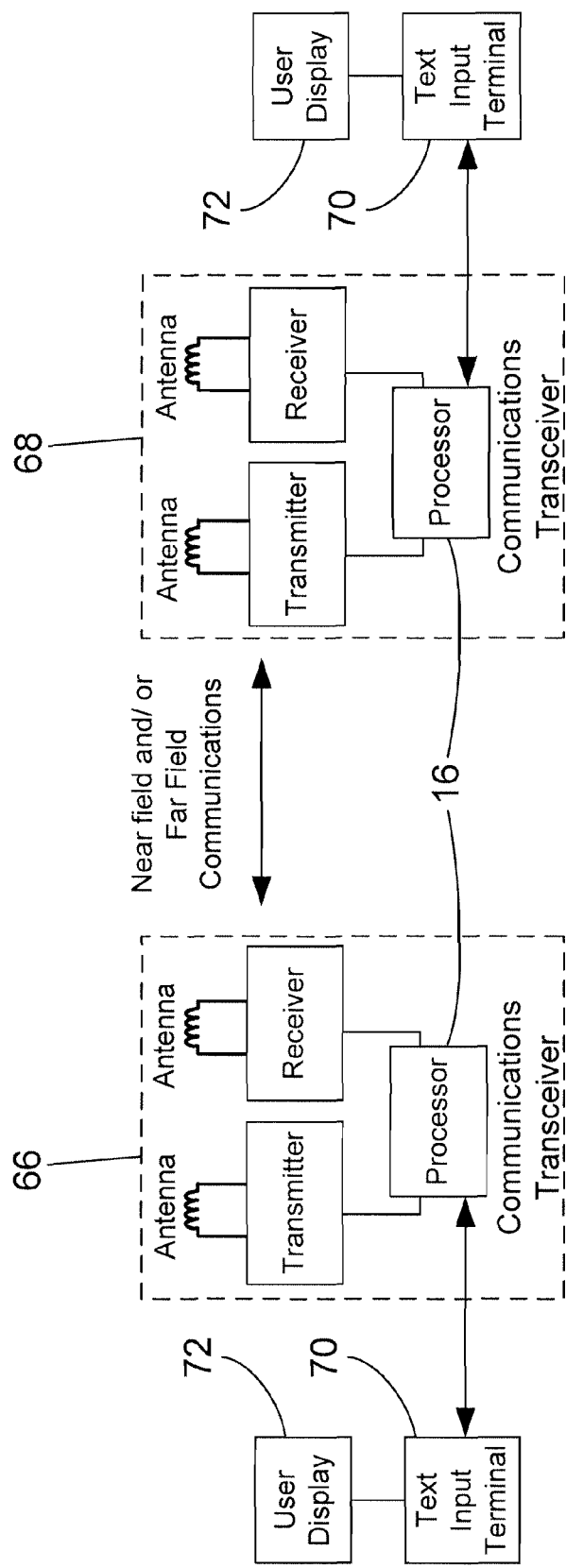
FIG. 7 is a block diagram of one embodiment of a system of the present invention for allowing underwater diver-to-diver text communications.

FIG. 7 illustrates another telecommunications system for underwater diver-to-diver or similar communications that also has two telecommunications units 66, 68, each of which includes the transceiver of FIG. 1. In this case, connected to the processor 16 of the transceiver is a text input 70 for allowing a user to input text messages and a display 72 for displaying such text messages. Text entered by the users is passed to the on-board processor 16 and then to the transmitter, where it is digitally modulated onto a carrier frequency and transmitted. As before, the transmission protocol used could be point-to-point or broadcast, depending on the application. Techniques for allowing mobile text communications are known in the art and so will not be described in detail. The devices of FIG. 7 allow text communication between divers using electromagnetic propagation as the communication channel. Because texting is a very low data rate application, a low frequency carrier can be used which will experience a comparatively low attenuation. Signal reception should be possible in the far field. To maximize range, the carrier frequency used typically would be below 100 Hz, for example 40 Hz.

Figure 8:
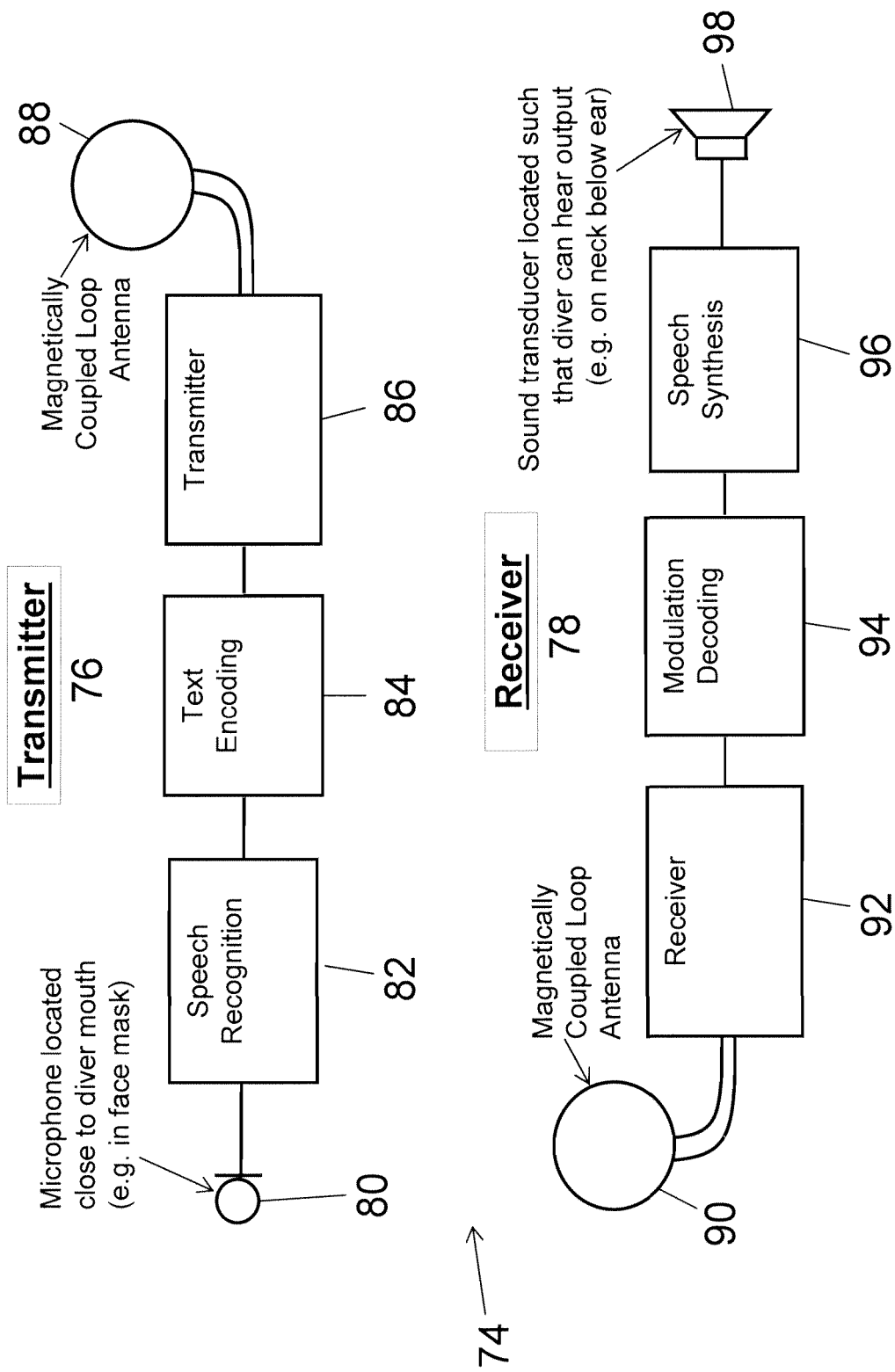
FIG. 8 is a block diagram of one embodiment of a system of the present invention for reduced bandwidth voice communications using speech recognition and speech synthesis techniques to allow narrow bandwidth text transmission.

FIG. 8 illustrates an alternative voice communications system 74 for underwater diver to diver or diver to surface communications. This also has two telecommunications units here drawn as separate transmitter and receiver units 76 and 78 respectively. The transmitter unit has a microphone 80 that is located, for example, within a diver's mask so that it is close to the diver's mouth in use. This is connected to a speech recognition module 82, which is operable to convert speech to an electronic representation of text. This can be done using commonly available speech recognition software, the output of which is a stream of characters in electronic form. Connected to the speech recognition module 82 is a text encoder 84 that is connected to a transmitter 86 that is coupled to a magnetic antenna 88. The encoder 84 converts the speech signals into text-based data. An example of a suitable format for this data may be ASCII or preferably a more efficient coding mechanism to minimize the data to be transmitted and therefore the required bandwidth. This text-based data is then modulated and transmitted by the transmitter and antenna 86 and 88 respectively to the antenna 90 and receiver 92. Connected to the receiver 92 is a demodulator 94, which is operable to recover the text data. This is processed using a speech synthesis module 96 to convert the data into artificial voice signals for the receiving party to hear. This speech signal is then fed to the receiving party using a suitable earphone, loudspeaker or other such device 98 as appropriate for the receiving party.

The system of FIG. 8 is particularly beneficial since it reduces data bandwidth to the lowest practicable minimum. This allows use of a lower carrier frequency, and hence a much lower signal attenuation. Bandwidth is much smaller than alternative audio compression techniques, which must act to efficiently represent the full range of audio frequencies that comprise the human voice. In comparison, a recognition and synthesis based system only conveys the textual meaning of the speech. The system has the added advantage of being more clearly intelligible than a direct audio link. Restrictive facemasks and breathing apparatus affect speech underwater. A speech recognition algorithm can be adapted to work effectively with underwater speech. The synthesized speech recreated at the receiver will be of a much higher quality than the original.

Figure 9:
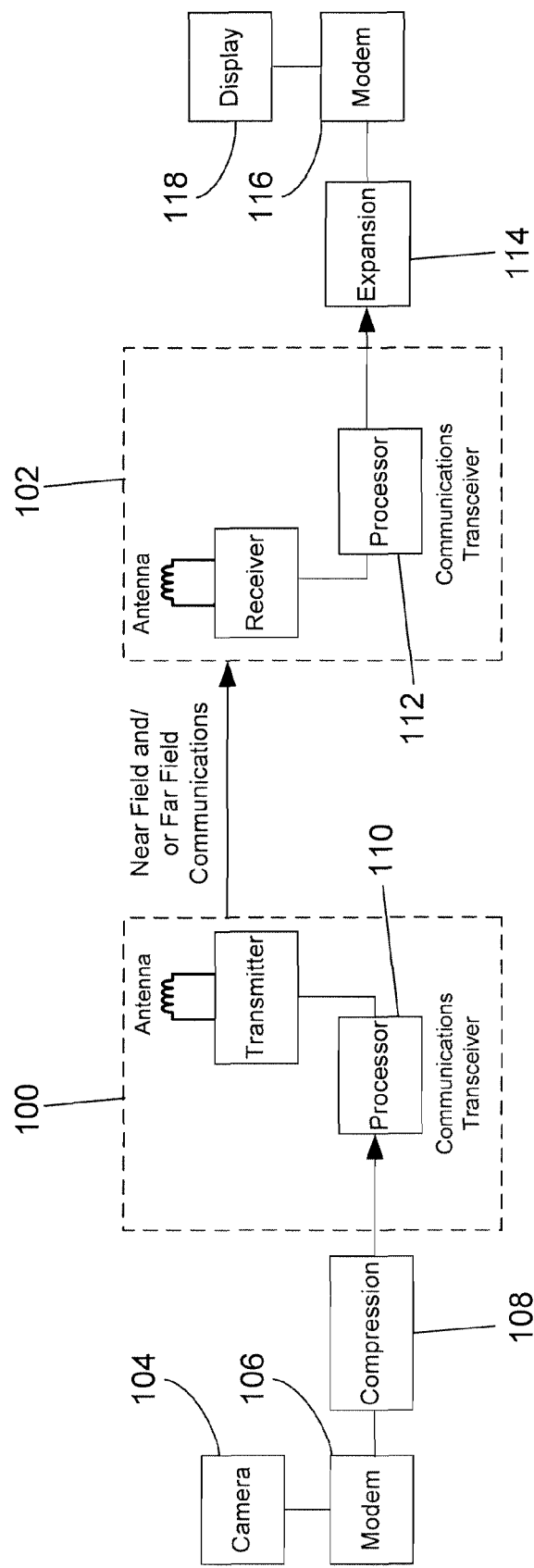
FIG. 9 is a block diagram of one embodiment of a system of the present invention for allowing underwater video communications.

FIG. 9 illustrates a telecommunications system for providing a video link. As before, the system has two telecommunications units 100 and 102, each of which includes the transceiver of FIG. 1. However, in this case, a camera 104 is provided. The camera generates a digital format representation of image or image and sound. This is connected via a modem 106 to image compression means 108, which is connected in turn to the transceiver processor 110. Connected to the processor 112 of the other transceiver are a corresponding image decompression means 114, a modem 116 and a display 118. Images captured by the first transceiver 100 can be sent to the second transceiver 102 using near field or far field electromagnetic propagation as the communication channel, and subsequently displayed on the display. Video compression algorithms are applied to reduce the bandwidth and carrier frequency, thereby increasing the range of reception for underwater communications. In this case the carrier frequency would typically be in the range 100-200 kHz, for example 130 kHz for monochrome ¼ VGA 0.5 frames/s using mpeg4 compression. Dependent on requirements and compromises possible and acceptable in particular applications, other still more efficient encoding methods known in the literature may be used instead. Techniques for allowing video images to be sent between mobile units are known in the art and so will not be described in detail.

Figure 10:
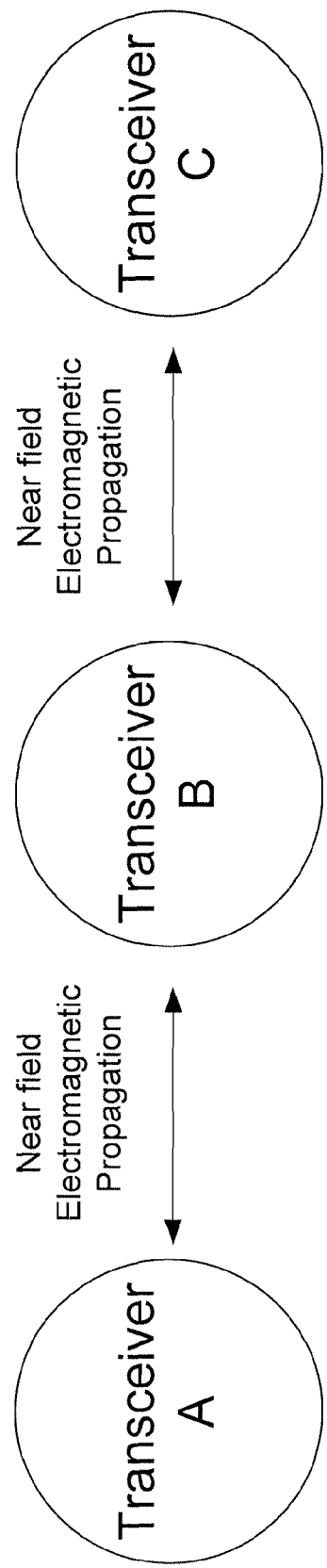
FIG. 10 is a block diagram of one embodiment of a mesh network of the present invention for use in an underwater communications system.

In each of the systems of FIGS. 6 to 9, electromagnetic signals are used to communicate between submerged stations. However, as will be appreciated, under water this provides a relatively short range, and so one of a group of mobile stations may not be able to communicate directly to another. To extend the usable range, a mesh network may be used to link between individual nodes. In this, each hop is an achievable shorter range. Repeaters extend range within a distributed ad-hoc network (mesh networking). FIG. 10 illustrates an example of this. This includes mobile units A and C and a mesh transceiver B. Although not shown, the mesh would typically include a plurality of such transceivers B. Each transceiver of the mesh has a magnetically coupled electrically insulated antenna and each communicates with others using short-range propagation. In use, rather than signals being sent directly between mobile diver units, they are sent via the intermediate mesh transceiver B. Hence, in this case communication between A and C is possible through relay B.

In certain applications of the present invention, surface repeater buoys are deployed to link between buoys to extended underwater transmission ranges. The surface repeater buoy acts to receive the subsea radio signal and then relays the information to a second buoy using terrestrial radio devices, including but not limited to the use of a higher carrier frequency.

The present invention can convey a variety of different types of information, including but not limited to the following examples in the fields of audio transmission, video transmission, text data transmission, control data, and other forms of information that can be encoded in digital form:

In one embodiment, audio transmission includes: diver to diver voice; diver to vessel voice; diver to shore voice; voice using a remote microphone and/or hydrophone; voice between submarine and submarine; voice between submarine and surface vessel; and voice between submarine and a shore station.

In another embodiment, video transmission includes: video images conveyed for assistance in steering and control of autonomous underwater vehicles (AUV) and remotely operated vehicles (ROV); images for monitoring underwater construction sites; images which assist the docking of AUVs and other mobile underwater devices; images for finding and checking the presence of underwater objects; images for assessing damage and the maintenance condition of varied underwater systems and plant such as pipelines, risers, valves and platforms; images for assisting the remote control of tools and manipulators on AUVs and ROVs; and images conveyed for assessment of environmental damage.

In another embodiment, text data includes: as required in diver to diver communication; and in diver to shore or vessel communication.

In another embodiment, control data includes: data used as part of the communications aspect of supervisory control and acquisition systems (SCADA); and of command and control systems for underwater vessels including backup for wired control.

Additional forms of information transfer can be utilized with the systems and methods of the present invention. These additional forms of information transfer include but are not limited to, data transmitted from/to seismic, geophysical, environmental and other underwater data loggers and a surface vessel or an AUV or ROV; data of generic types transferred between an AUV and a surface vessel or docking station; data transferred from sensors to a vessel or shore for monitoring of the environment and for detection of the presence of alien objects as part of homeland security; data and communication control protocols required for provision of internet and other communications access points in swimming pools, reservoirs, sea water areas such as around shipwreck sites; data communicated through ice, both solid and floating; data over communication links in the networking of sensors, assets, vehicles and people, not all of which are necessarily underwater; data transferred for targeting and priming to/from a torpedo or other vehicle while in a torpedo bay or in motion, and the like.

Figure 11:
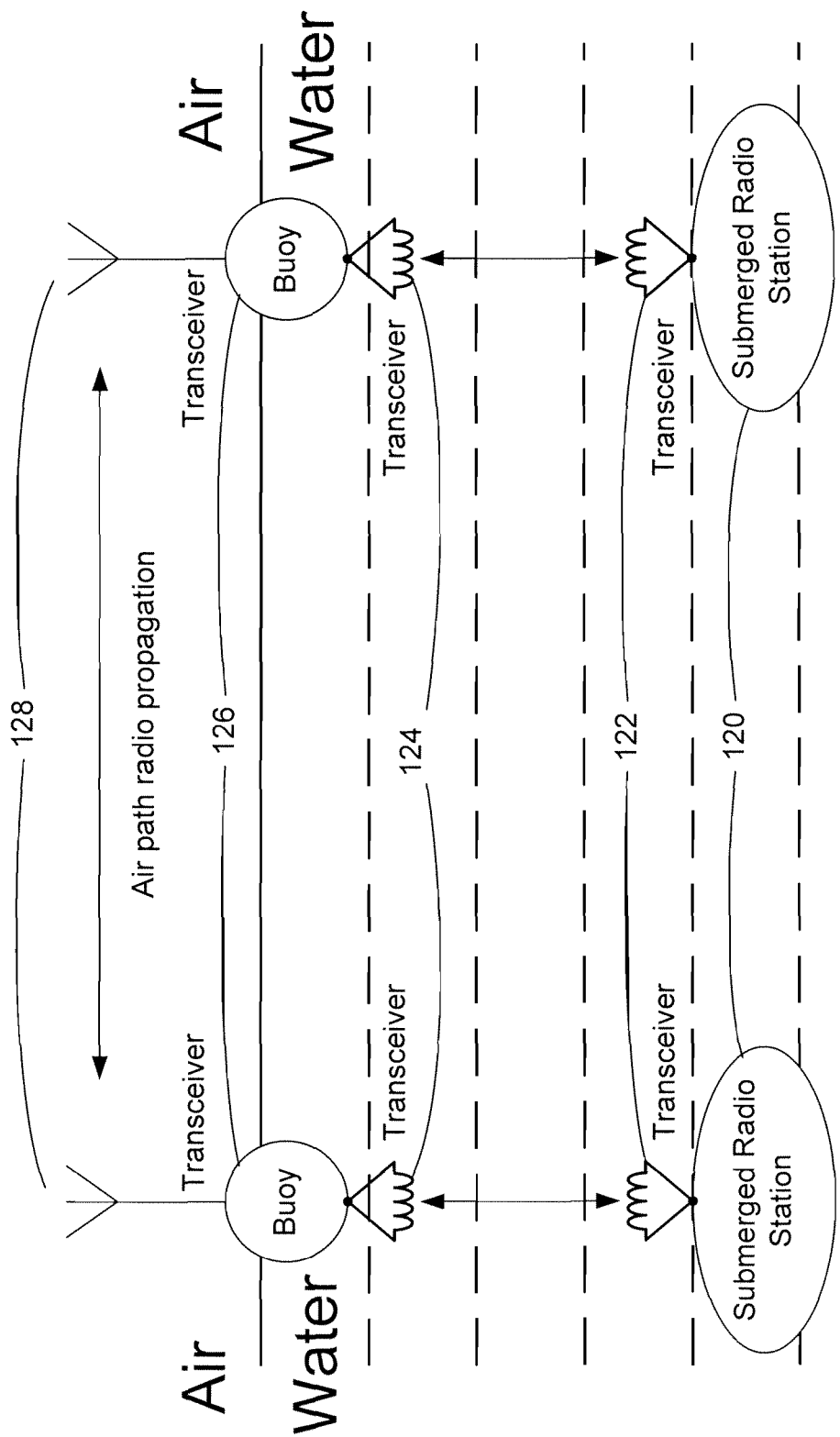
FIG. 11 is a block diagram of one embodiment of a water to surface communication system of the present invention.

To provide an even greater communication range, signals may be sent from one underwater transceiver to another via an above-water air path. FIG. 11 illustrates an example of this. In this case, underwater radio stations 120 are each provided with an underwater transceiver 122 that is able to communicate with other underwater transceivers 124 that are connected to, for example, buoys 126. As before, all of the underwater transceivers 122, 124 have electrically insulated magnetic coupled antennas for allowing underwater near field electromagnetic propagation. Associated with each buoy 126 is a radio transceiver 128 that is able to communicate with the underwater receiver and also to transmit and receive electromagnetic signal via an air path. Hence, the buoys 126 can effectively act as air transmission repeater relays for forwarding via an air path messages or signals originally generated underwater. In this way, signals can be sent between underwater units or between an underwater unit and a remote station over relatively long distances. This provides the possibility of long range, low data rate, low carrier frequency telemetry and remote control from underwater or surface equipment. Of course, as will be appreciated, rather than sending signals from an underwater transmitter to an underwater receiver via a surface based relays, data could merely be transmitted from an underwater transmitter to a surface based receiver, or vice versa. This is possible because the magnetic component of any electromagnetic signal crosses the water to air boundary with relatively low attenuation. Magnetic coupled antennas make optimal use of this property. In similar manner, data may be transmitted between an underwater site and another underwater site or a site on the surface or on land, using for part or all of the route a path of lesser attenuation through the sea bed.

Figure 12:
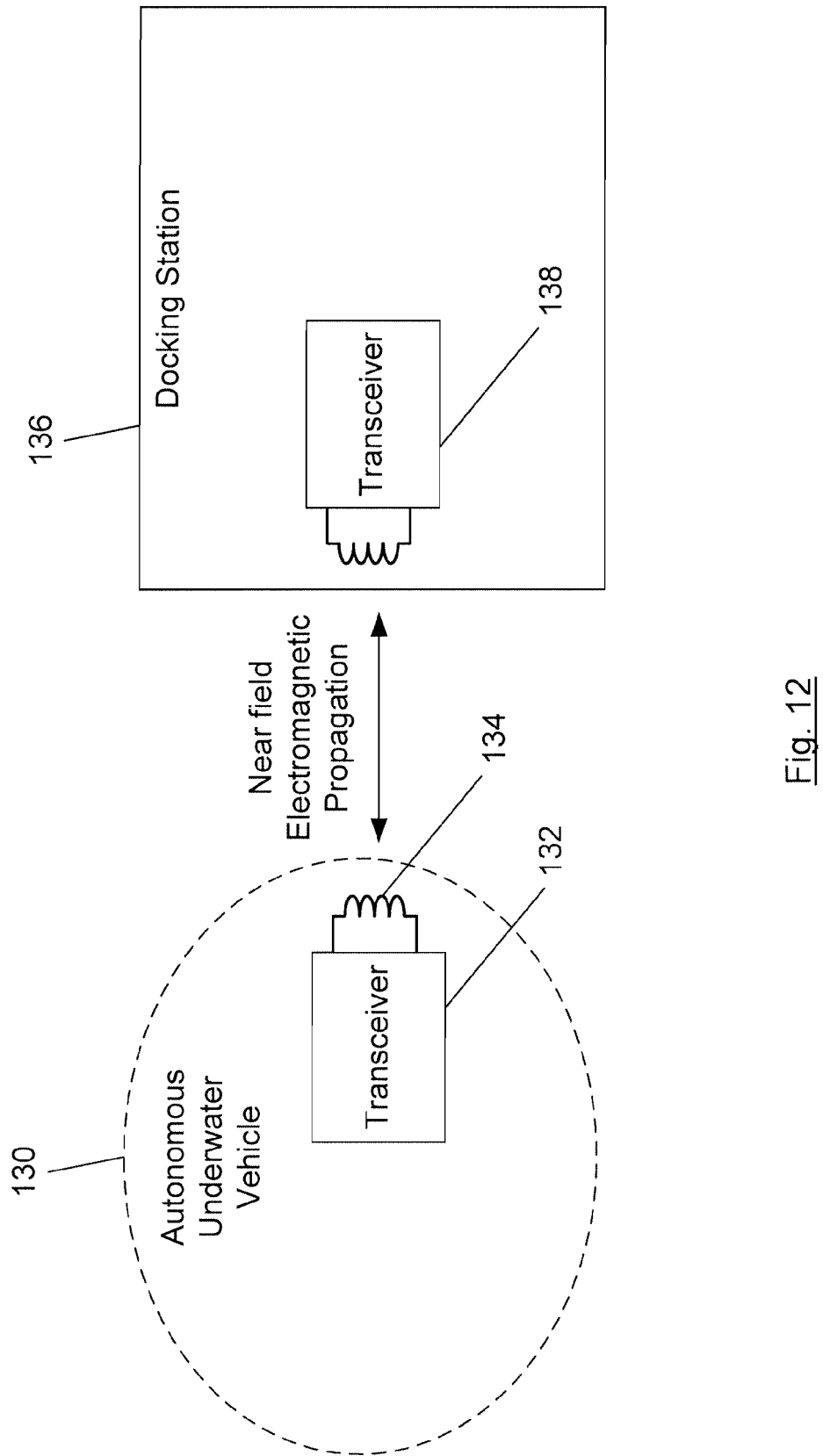
FIG. 12 is a block diagram of one embodiment of a communication system of the present invention that can be used for an autonomous underwater vehicle.

FIG. 12 illustrates an autonomous underwater vehicle 130 that includes the transceiver 132 of FIG. 1. In this embodiment, the magnetic coupled antenna 134 is provided in the vehicle hull. Associated with the vehicle 130 is a docking station 136 that includes a corresponding transceiver 138. The vehicle and station transceivers 132 and 138 are arranged to transfer data using near field electromagnetic propagation. In practice, this means that data transfer only happens when the vehicle 130 and the station 136 are relatively close together, for example less than about two meters apart. This provides a very short range, but high bandwidth data link that allows high data transfer rates. For example, operating at a 70 MHz carrier a 10 Mbps data link could be operated over a range of 0.5 m.

Figure 13:
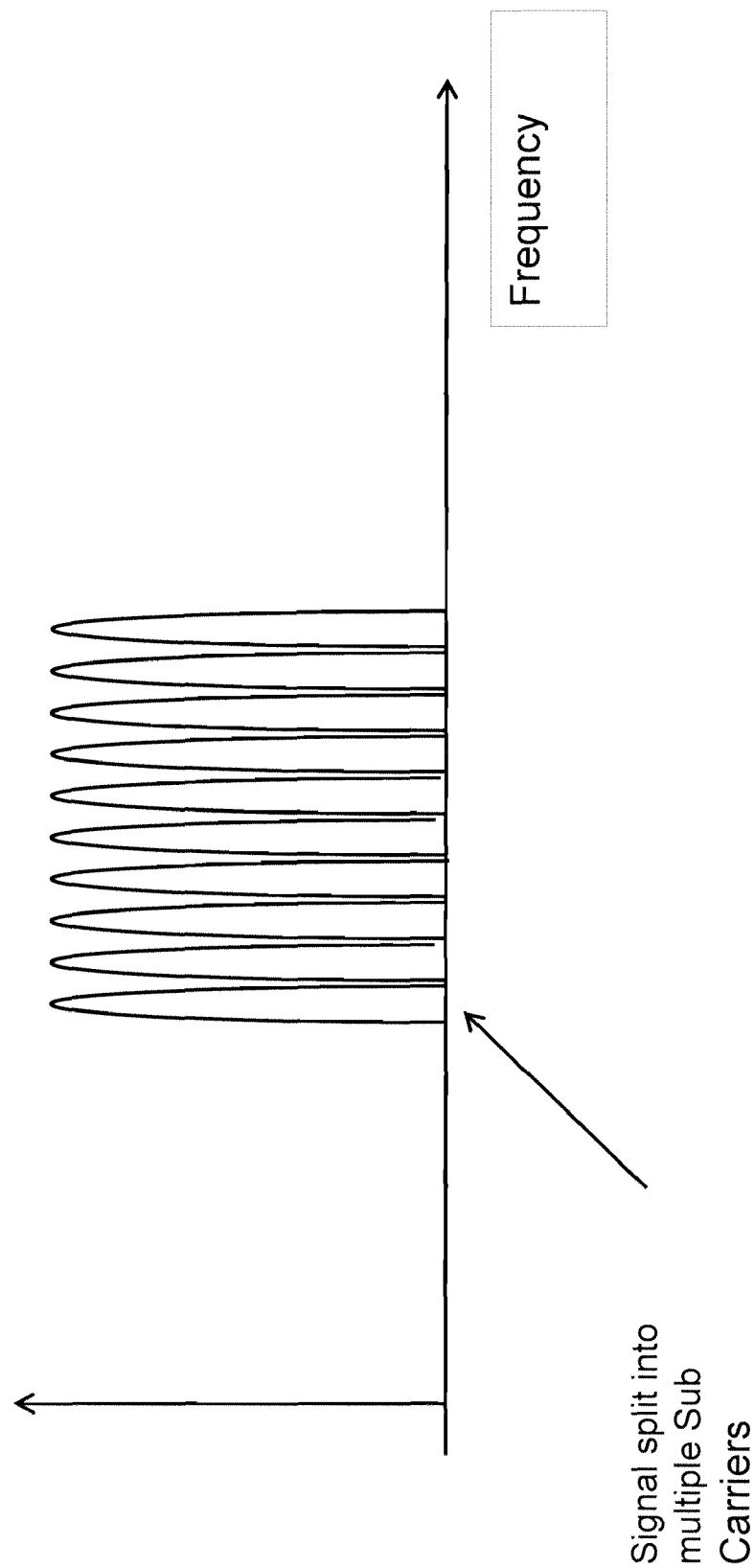
FIG. 13 illustrates a modulation signal for use in a signal modulation scheme.

To offer improved resilience, a modulation scheme can be used in the systems described whereby the carrier is modulated by multiple narrow band sub-carriers, as shown in FIG. 13. The modulation scheme may be based on orthogonal frequency division multiplexing (OFDM). The path for electromagnetic radiation exhibits dispersion such that different frequencies of modulation propagate at different speeds and are attenuated by differing amounts resulting in distortion of the signal at the receiving system. This effect is accentuated where a wide band modulation is used thus dispersion is more significant. In addition, the path may exhibit some degree of multi-path characteristic where, other than the direct path between the communication stations, the energy may take alternative paths either reflected from objects such as the seabed, sea surface or offshore structures or conducted through either the air or the seabed. Modulating the signals using multiple narrow band sub-carriers allows distortions caused by the underwater transmission path to be overcome. At the transmitter, a single data stream can be multiplexed to form many separate channels of data. Each narrow bandwidth channel is transmitted over a separate frequency channel. Each channel experiences different levels of propagation delay due to its frequency of transmission. At the receiver, the differential delay of each channel is removed and the multiple data streams re-assembled to extract the original broadband data stream.

Where modulation is used, at each transmitter the signal is modulated onto multiple narrow band sub carriers to make up the required signal bandwidth. Many suitable modulations schemes are known such as quadrature amplitude modulation (QAM) and Orthogonal Frequency Division Multiplexing (OFDM). The combined signal is then modulated onto the carrier. At the receivers, the signal is detected and split into the same multiple narrow band carriers, which are in turn demodulated to recover the information. The processing may be analogue or digital, although typically the processing will be digital. The digital implementation could employ an inverse fast Fourier Transform (FFT) to form the multiple narrow-band signals into a single carrier transmission. This may be combined with an error correction coding scheme whereby redundancy is introduced to the digital bit stream to allow detection and recovery from corruption of the signal.

Figure 14:
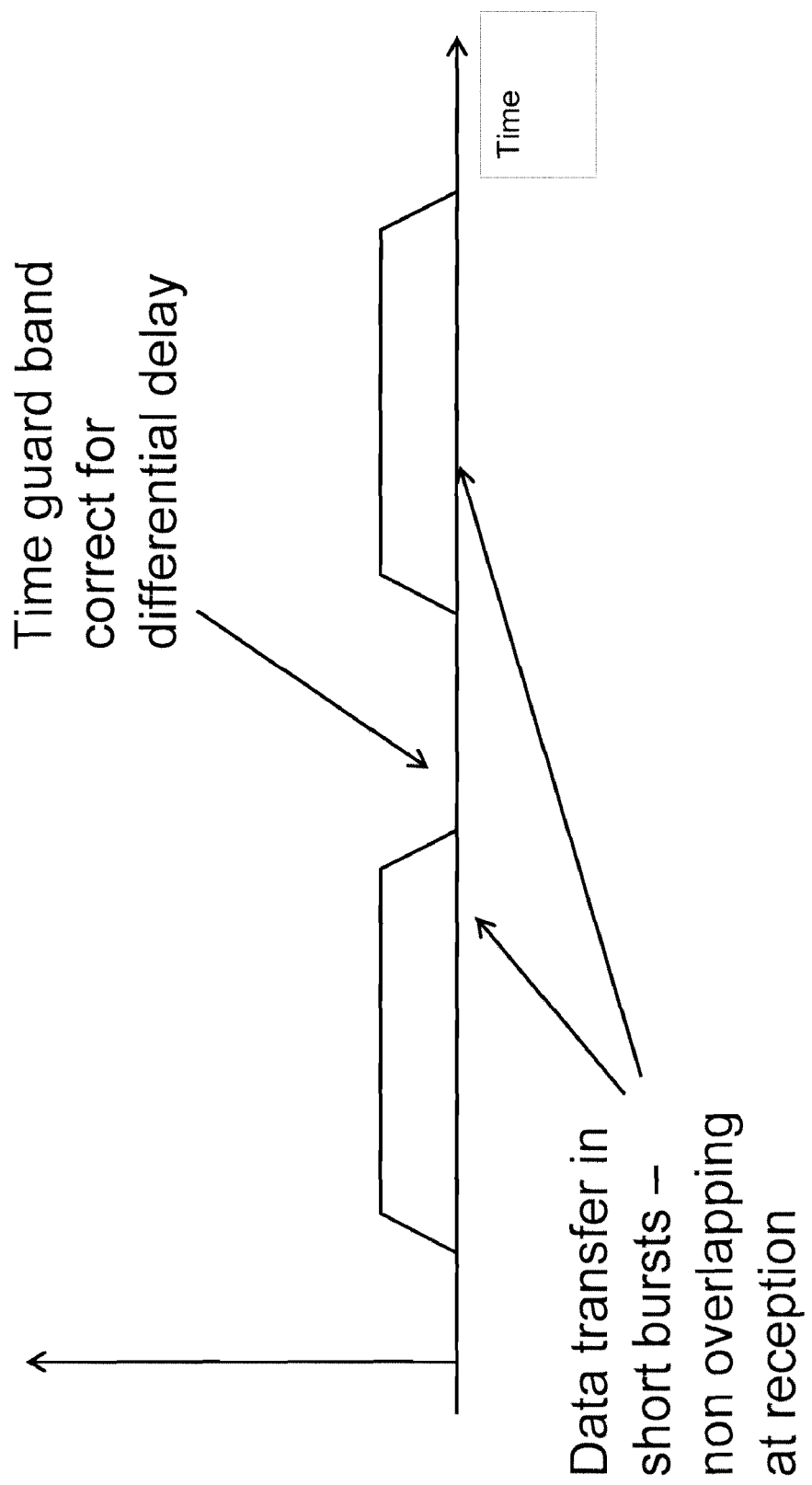
FIG. 14 illustrates a transmission scheme that employs guard bands.

FIG. 14 illustrates another technique that may be employed with the present invention. This involves the use of guard bands between symbols, so that signals resulting from multiple paths do not interfere with adjacent symbols. This is possible because the symbol rates required on each frequency are low compared to the overall data rate of the system. For example, a system transmitting 1 million symbols per second may employ 1000 frequency channels, this being made possible by the use of digital processing techniques such as FFTs. The individual symbol rate for each channel is 1 thousand symbols per second, which is equivalent to 1 ms per symbol. Over a 1 km range, the multi-path effects will typically be less than 30□s so the guard band need only extend the symbol length by less than 4%.

It will be appreciated, many types of modulation may be adopted singly or in combination with various embodiments of the present invention, whether combined with OFDM or not, including but not limited to: quadrature amplitude modulation (QAM) with many possible constellations known in the art; phase modulation (PM); frequency modulation (FM) or phase shift keying (PSK); frequency shift keying (FSK); amplitude modulation (AM); and amplitude modulation with single sideband suppressed carrier (SSB-SC), double sideband suppressed carrier (DSB-SC), single sideband with vestigial carrier, and the like.

Figure 15:
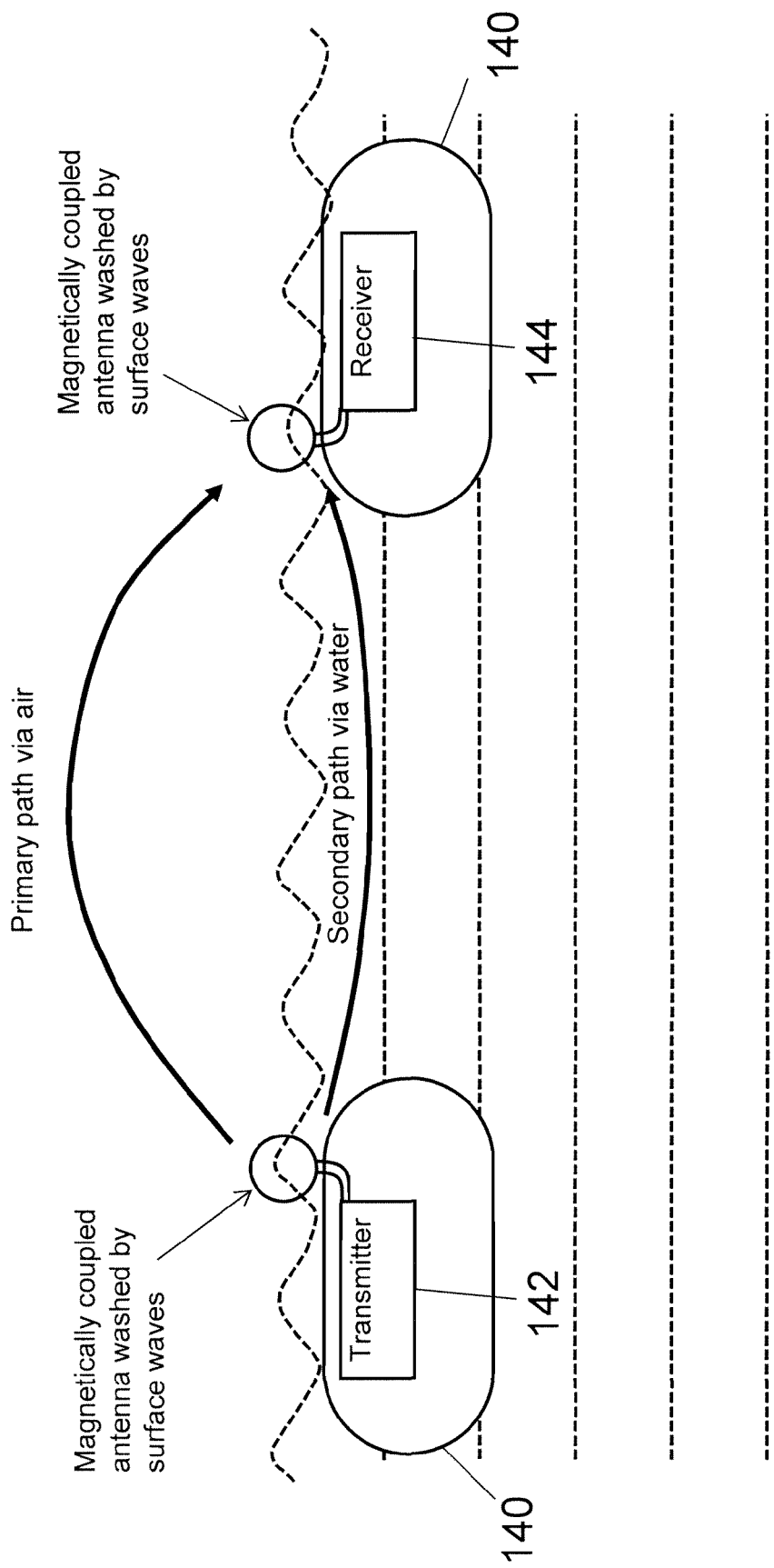
FIG. 15 is a schematic view of one embodiment of a communications system of the present invention that is operable above water and below water, as well as when the system is awash.

FIG. 15 shows a system for allowing water-based vehicles to communicate at the surface, in particular where wave wash impinges the antenna systems. This has two stations 140, for example two mobile stations, one having the transmitter 142 of FIG. 2 and the other having the receiver 144 of FIG. 3, although each could in fact be a transceiver. Many marine systems are required to operate both submerged and at the surface and some are regularly awash with wave action, as shown in FIG. 14. For example, autonomous underwater vehicles operate much of the time submerged. This poses a problem for communications between the AUV and surface vessels for example. Typical traditional antennas that employ electric field coupling such as dipoles are ineffective for the periods when partially or fully immersed in water. However, in accordance with the present invention, the use of magnetically coupled antennas allows communication underwater, above water and when the system is awash.

To improve performance, automatic gain control may be used to cope with the variation of signal strength caused by wave wash. Gain control can be implemented by means of a control loop. For example the received signal strength can be measured by developing a voltage across a rectifying detector diode. Amplifier gain can be controlled in response to measured signal strength to compensate for increased path loss during wave wash of the antennas. Gain control may be applied at both the receiver and the transmitter to provide additional dynamic range, the transmitter power being controlled where a two-way link allows the short-term signal path loss to be determined. This system will operate satisfactorily where one or more of the communicating antennas is wholly or partially immersed in water.

In all of the communications systems of the present invention, described above, the operating signal carrier frequency will depend on the particular application. The carrier frequency is selected as a function of the data transfer rate and the distance over which transmission has to occur. For example, for short-range communications where a high data rate is required, a relatively high frequency would be used, for example above 1 MHz. In contrast for long-range communications where attenuation losses are likely to be a problem, relatively low frequencies would be used, for example below 1 MHz, and in many cases below 100 kHz.

Another technique that may be applied in any of the underwater communications systems described above involves the use of an adaptive carrier frequency based on range of operation. In this implementation, the carrier frequency employed to convey information is chosen to maximize the information rate possible for the given signal path. The most significant influence on the optimum frequency to choose will be the range between the communicating systems. One implementation uses multiple fixed frequencies that are known to all communicating stations. To first establish a connection, transmission commences on the lowest frequency. Once communication is established, the systems may then adapt the frequency of operation up and down to maximize data rate. This may be performed based on the received signal strength. An alternative scheme employs the lowest frequency at all times to maintain timing and to communicate the main frequency being chosen to carry information.

The electromagnetic communication system, in which embodiments of the invention is embodied, may be combined with acoustic communication and/or with optical communication to provide enhanced capability. Whereas acoustic communications offer long-range capability they are limited in terms of robust operation in noisy environments and can only offer a limited bandwidth. The range of operation is limited with electromagnetic communications but it is immune to acoustic noise and has a wide bandwidth capability. By way of example a system of the present invention can include an acoustic modem and an underwater electromagnetic communications system as described above. The two systems can be combined in a processing unit to select the communications path based on appropriate criteria. These criteria may include factors such as measured error rates, range of operation, measured signal strength or required bandwidth. If very high bandwidth is required when the ends of the communication link are close enough to allow optical communication, this method similarly may be brought into operation in preference to, or in addition to, electromagnetic communication.

In various embodiments, the system of the present invention includes enhancements to receive signal strength and/or communication distance. These enhancements can apply variously to transmitters, receivers and antennas, and are known in the art.

Directional antennas may be adopted to concentrate and maximize the power which a transmitter sends in the direction of a receiver and, by the principle of reciprocity, which a directional receive antenna can intercept. In as much as directional properties can be improved, communication range will be increased. If transmit and/or receive antennas are steered towards each other, preferably with dynamic real-time adjustment, then the optimum signal can be provided at all times. Diversity techniques employing multiple antennas at receive and/or transmit sites may be adopted, and intelligent switching adopted to use the most advantageous signal path at any time.

It will be appreciated that magnetic coupled antennas at the transmitter and receiver need not be of the same size. Where an end of the communications link is static or may be moved only occasionally, it may be possible to deploy an unusually large antenna loop or solenoid. For example, this may be possible for an underwater fixed sensor, where its antenna could lie flat on the sea floor; and for a static central communication site. Such antennas could be formed of loops many meters in diameter if necessary. Whether deployed by the transmitter or receiver, larger antenna size will increase the received signal e.m.f. approximately in proportion to the increased area of the antenna. Of course, the largest possible size of antenna at both ends is usually advantageous to maximize the received signal.

The magnetic and electromagnetic field from a transmitter (and correspondingly a receiver) may be increased by using latest magnetic core materials of the highest possible permeability in the antenna in order to increase magnetic flux for given antenna dimensions.

While magnetic coupled antennas may be used, electromagnetic antennas of plain wire similar to those of conventional radio methods, and electric antennas which predominantly excite and detect an electric field, can also be deployed; and they may be deployed in combination to achieve the strongest aggregate received signal.

For maximum signal from a magnetic coupled transmit antenna, the greatest possible current is required in the loop or solenoid. Where cryogenic cooling is possible, the use of superconductivity can increase the current possible through the conductors of the antenna. In addition, highly sensitive receivers may be constructed using SQUID techniques and by using Josephson junction methods, as will be known to those skilled in these arts.

Particularly in deployment environments where receivers and/or transmitters are powered by batteries of limited capacity and/or transmission is of high power, methods are desirable to conserve energy. To achieve this, it is possible to transmit only when new relevant data is available at the transmit site; or to transmit only periodically; or to transmit only when a signal from the receive end requests data. Moreover, if the receiver knows when to expect data, either because transmission times are known or because the receive site requests transmission, most of the receiver circuits may be dormant at other times and so conserve energy also. Energy may also be conserved by reducing transmit power to the lowest level necessary for reliable communication. Reduction from maximum power could be based on known factors such as distance, or the receiver could inform the transmitter dynamically of the level it is receiving so that, when possible, the transmitter can reduce its power to a lesser level which is still adequate or, conversely, increase power when necessary. If acoustic and/or optical communication methods are available in addition to electromagnetic, then it may be advantageous to switch to whichever method uses the least power for the communication conditions found to be encountered.

In certain embodiments, several antennas can be used with systems of the present invention and be deployed across a region of sea or sea bottom where divers or underwater autonomous vehicles are to operate, so increasing the area over which communication can take place. While discrete loop antennas will often be optimal, other forms of antenna may also be used including antennas of distributed wire or cable. Although these may provide a weaker signal at a given distance from the wire, operation over a larger distance close to the antenna will be possible. The antennas can transmit and/or receive the same signal, or they could handle different signals.

Where different transmit signals are used, these also could supply location information to a diver or vehicle in each vicinity. In addition, multiple antennas could carry multiple channels, allowing multiple links to operate simultaneously. By use of data multiplexing, as is known in the art, a number of logical channels may be carried by the same carrier, and to different end stations or to different functions at the same end station.

It will be appreciated that the embodiments illustrated in FIGS. 1-15 can be used singularly as well as in various combinations of the embodiments. The systems and methods of the present invention can be used in seawater, fresh water and any brackish composition in between. Because relatively pure fresh water environments exhibit different electromagnetic propagation properties from seawater, different operating conditions may be needed in different environments. Optimization for specific saline constitutions will be apparent to any practitioner skilled in this area.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A communications system comprising:
    a transmitter which comprises: a data input; a modulator, for modulating the data onto a carrier signal, and an antenna for transmitting modulated electromagnetic and/or magnetic signals,
    a remote receiver which comprises an antenna for receiving modulated electromagnetic and/or magnetic signals, a digital data compressor for compressing data that is to be transmitted prior to modulation onto a carrier signal, and
    a digital data de-compressor for decompressing the signals received by the receiver antenna,
    wherein at least one of the transmitter and/or remote receiver is placed in a fluid propagating medium.

2. The communications system of claim 1 wherein each said antenna is an electrically insulated, magnetic coupled antenna.

3. The communications system of claim 1 wherein each said antenna is an electric field couple antenna.

4. The communications system of claim 1 wherein said receiver further comprises a demodulator, for demodulating modulated signals received by the receiver antenna.

5. The communications system of claim 1 wherein the said data input includes at least one of a text input; an audio input for capturing audio signals; an image input for capturing an image and a video input for capturing a video image.

6. The communications system of claim 1 wherein each said antenna includes at least one of loops and solenoids.

7. The communications system of claim 1 wherein each said antenna is surrounded with a low conductivity material with a permittivity to match that of the propagating medium.

8. The communications system of claim 1 wherein the propagating medium is water.

9. The communications system of claim 1 wherein one or more intermediate transceivers are provided between the transmitter and the remote receiver to relay signals between said transmitter and said remote receiver.

10. The communications system of claim 9 wherein at least one of the said one or more intermediate transceivers and one of said transmitter or remote receiver are under water and are operable to pass a signal between one another through a water propagation path.

11. The communications system of claim 9 wherein at least one of the said plurality of intermediate transceivers and one of said transmitter or remote receiver are in air and are operable to pass a signal between one another through an air propagation path.

12. The communications system of claim 1 wherein the said transmitter and said remote receiver are each placed in a fluid propagating medium.

13. The communication system of claim 1 wherein the said transmitter is placed in a first fluid propagating medium and the said remote receiver is place in a second low fluid propagating medium.

14. The communications system of claim 1 wherein at least part of the communications system is positioned in a fluid propagating medium.

15. The communications system of claim 1 wherein said fluid propagating medium is a non-water fluid or gas.

16. The communications system of claim 1 wherein said transmitter and said receiver are operable to communicate within a near field of said electromagnetic and/or magnetic signals.

17. The communications system of system of claim 1 wherein said near field of said electromagnetic and/or magnetic signals corresponds to the region around said transmitter wherein at least one of inverse distance squared ($1/r^2$) and inverse distance cubed ($1/r^3$) field components of said electromagnetic and/or magnetic signals is greater than an inverse distance ($1/r$) field component thereof.

18. A communications system comprising:
    a transmitter which comprises: a data input; a modulator, for modulating the data onto a carrier signal, and an antenna for transmitting modulated electromagnetic and/or magnetic signals,
    a remote receiver which comprises an antenna for receiving modulated electromagnetic and/or magnetic signals
    wherein at least one of the transmitter and/or remote receiver is placed in a fluid propagating medium and each of said transmitter/or remote receiver is operable to communicate within a near field of said electromagnetic and/or magnetic signals, said near field corresponding to the region around the transmitter wherein at least one of inverse distance squared ($1/r2$) and inverse distance cubed ($1/r3$) field components of said electromagnetic and/or magnetic signals is greater than an inverse distance ($1/r$) field component thereof.

* * * * *